United States Patent
Moriwaki

(10) Patent No.: US 9,030,616 B2
(45) Date of Patent: May 12, 2015

(54) ELECTRO-OPTIC APPARATUS AND ELECTRONIC APPARATUS

(75) Inventor: Minoru Moriwaki, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 88 days.

(21) Appl. No.: 13/572,869

(22) Filed: Aug. 13, 2012

(65) Prior Publication Data

US 2013/0044284 A1    Feb. 21, 2013

(30) Foreign Application Priority Data

Aug. 17, 2011    (JP) .................. 2011-178251

(51) Int. Cl.
  *G02F 1/1343*    (2006.01)
  *G02F 1/1333*    (2006.01)
  *G02F 1/1362*    (2006.01)

(52) U.S. Cl.
  CPC .... G02F 1/136277 (2013.01); G02F 1/136213 (2013.01); G02F 1/136227 (2013.01)

(58) Field of Classification Search
  CPC ............ G02F 1/136213; G02F 1/136227; G02F 1/133345
  USPC .......................................... 349/38, 138
  See application file for complete search history.

(56) References Cited

U.S. PATENT DOCUMENTS

| | | | |
|---|---|---|---|
| 6,593,592 B1 * | 7/2003 | Yamazaki et al. | 257/71 |
| 7,855,759 B2 | 12/2010 | Nakagawa | |
| 2008/0029764 A1 * | 2/2008 | Adachi et al. | 257/59 |
| 2010/0033645 A1 * | 2/2010 | Nakagawa | 349/39 |
| 2010/0253822 A1 * | 10/2010 | Ebiko | 348/294 |

FOREIGN PATENT DOCUMENTS

| | | |
|---|---|---|
| JP | 2000-284722 A | 10/2000 |
| JP | 2004-247500 A | 9/2004 |
| JP | 2007-212812 A | 8/2007 |
| JP | 2009-15049 A | 1/2009 |
| JP | 2010--39212 A | 2/2010 |

* cited by examiner

*Primary Examiner* — Nathanael R Briggs
(74) *Attorney, Agent, or Firm* — ALG Intellectual Property, LLC

(57) ABSTRACT

A retention capacity in which a first electrode, a lower side capacity insulation film, a second electrode, an upper side capacity insulation film, and a third electrode are laminated is formed between a pixel electrode and a TFT. The lower side capacity insulation film and the upper side capacity insulation film respectively include a plurality of insulation films, and the lamination order thereof is the same.

13 Claims, 5 Drawing Sheets

ELECTRO-OPTIC APPARATUS AND ELECTRONIC APPARATUS

BACKGROUND

1. Technical Field

The present invention relates to an electro-optic apparatus such as a liquid crystal apparatus, and an electronic apparatus, such as a liquid crystal projector, which includes the electro-optic apparatus.

2. Related Art

As this type of electro-optic apparatus, there is, for example, an electro-optic apparatus which includes pixel electrodes, scan lines used to selectively drive the pixel electrodes, data lines, and Thin Film Transistors (TFTs) for switching pixels on a substrate, and which drives an active matrix. Switching devices, such as TFTs, and various types of wiring are formed on the substrate as a laminated structure.

In the above-described electro-optic apparatus, retention capacities are formed on the laminated structure, so that it is planned to increase the contrast of a display image and decrease flickering. For example, JPA-2000-284722 proposes a technology for implementing the increase in capacity by connecting a plurality of retention capacities in parallel.

However, it has become clear that, when the above-described plurality of retention capacities are formed, the temporal variation in fixed electrical potential, which is supplied to each of the retention capacities, increases because of the difference in the configurations of the respective retention capacities (in detail, materials and laminated structures) in the study performed by the inventors of the present application. The temporal variation in fixed electrical potential causes, for example, flickering or image sticking. Therefore, the above-described technology has a technical problem in that the quality of the display image may be degraded.

SUMMARY

The invention can be realized in the following forms or application examples.

Application Example 1

According to Application Example 1, there is provided an electro-optic apparatus including: a pixel electrode which is provided for each pixel on a substrate; a transistor which is provided to correspond to each pixel electrode between the substrate and the pixel electrode; and a retention capacity which is provided between the pixel electrode and the transistor, and which includes a first electrode, a second electrode arranged to face a side of the substrate of the first electrode through a first capacity insulation film, a third electrode arranged to face the side of the pixel electrode of the first electrode through a second capacity insulation film. Each of the first capacity insulation film and the second capacity insulation film includes a first insulation film and a second insulation film which is formed of a different material from the first insulation film and is provided on the side of the pixel electrode of the first insulation film.

The electro-optic apparatus according to the application example of the invention includes an electro-optic medium, such as liquid crystal, which is interposed between, for example, a device substrate, provided with pixel electrodes and transistors which are electrically connected to the pixel electrodes and include TFTs for switching pixels, and a counter substrate provided with counter electrodes facing the pixel electrodes. When the electro-optic apparatus is operated, image signals are selectively supplied to the pixel electrodes, so that an image is displayed on a pixel region (or an image display region) in which the plurality of pixel electrodes are arranged. Further, the image signals are supplied from data lines to the pixel electrodes at a predetermined timing in such a way that the transistors which are electrically connected between, for example, the data lines and the pixel electrodes are switched on or switched off.

According to the application example of the invention, a retention capacity is provided between each of the pixel electrodes and each of the transistors. In the retention capacity, capacity insulation films are interposed between the three electrodes, that is, the first electrode, the second electrode, and the third electrode. In detail, a first capacity insulation film is provided between the first electrode and the second electrode on the substrate side of the first electrode. In addition, a second capacity insulation film is provided between the first electrode and the third electrode on the pixel electrode side of the first electrode. That is, the retention capacity is configured in such a way that, from the substrate side, the second electrode, the first capacity insulation film, the first electrode, the second capacity insulation film, and the third electrode are sequentially laminated.

Each of the first capacity insulation film and the second capacity insulation film is provided to include a plurality of insulation films. That is, each of the first capacity insulation film and the second capacity insulation film is configured in such a way that different insulation films are laminated. In further detail, each of the first capacity insulation film and the second capacity insulation film is configured to include layers which are formed of $SiO_2$, SiN, or the like.

Here, in particular, according to the application example of the invention, the above-described retention capacity is provided such that the plurality of insulation films, which configure each of the first capacity insulation film and the second capacity insulation film, are laminated in the same order when viewed from the substrate side. In detail, the first capacity insulation film is laminated in order of $SiO_2$ and SiN from the substrate side. Likewise, the second capacity insulation film is laminated in order of $SiO_2$ and SiN from the substrate side. The second electrode and the third electrode are formed of the same material.

According to the study performed by the present inventor, since the retention capacity is configured such that the plurality of insulation films, which configure each of the first capacity insulation film and the second capacity insulation film, are laminated in the same order, it becomes clear that it is possible to reduce the temporal variation in fixed electrical potential to be supplied to the retention capacity. The temporal variation in the fixed electrical potential causes flickering or burning of the display image. Therefore, in the retention capacity according to the application example of the invention, it is possible to prevent such a defect on the display from being generated.

As described above, according to the electro-optic apparatus according to the application example of the invention, it is possible to display a high-quality image in such a way that the laminated structure of the retention capacity is configured in the same way from the substrate side.

Application Example 2

In the electro-optic apparatus according to the Application Example, it is preferable that a predetermined constant potential be supplied to the first electrode, and that the second electrode and the third electrode be electrically connected to the pixel electrode and the transistor, respectively.

According to this configuration, the first electrode is electrically connected using, for example, a capacity line and a contact hole, and a common potential which is supplied to the counter electrode is supplied as a predetermined constant potential. Meanwhile, the second electrode and the third electrode are electrically connected to relay layers, each of which relays the electrical connection between, for example, the pixel electrode or the transistor and the pixel electrode, through contact holes. Therefore, the potential of each of the second electrode and the third electrode is the same as that of the pixel electrode.

According to the above-described configuration, respective retention capacities can be formed between the first electrode and the second electrode and between the first electrode and the third electrode, and the retention capacities are connected in parallel. Therefore, it is possible to densely form retention capacities in a comparatively small area.

Application Example 3

In the electro-optic apparatus according to the Application Examples, it is preferable that the first electrode be electrically connected to the pixel electrode and the transistor, and a predetermined constant potential is supplied to each of the second electrode and the third electrode.

According to this configuration, the first electrode is electrically connected to the relay layer which relays the electrical connection to, for example, the pixel electrode or the transistor and the pixel electrode, through the contact hole. Therefore, the potential of the first electrode is the same as that of the pixel electrode. Meanwhile, the second electrode and the third electrode are electrically connected through, for example, the capacity line and the contact hole, and receive common potential which is supplied to the counter electrode as a predetermined constant potential.

According to the above-described configuration, retention capacities can be respectively formed between the first electrode and the second electrode and between the first electrode and the third electrode, and the retention capacities are connected in parallel. Therefore, it is possible to densely form retention capacities in a comparatively small area.

Application Example 4

In the electro-optic apparatus according to the Application Examples, it is preferable that the first insulation film be formed of $SiO_2$ and that the second insulation film be formed of SiN.

According to this configuration, since each of the first capacity insulation film and the second capacity insulation film is formed in order of $SiO_2$ and SiN films from the substrate side, it is necessary to remove the capacity insulation film which overlaps, for example, a display region in a planar fashion when the first electrode is formed. However, since the SiN film is arranged on the upper layer, it is possible to restrain the material of SiN from remaining. As a result, it is possible to restrain transmittance from deteriorating. In addition, likewise, since the SiN film is arranged on the upper layer when the third electrode is formed, it is possible to restrain the material of SiN from remaining.

Application Example 5

According to Application Example 5, there is provided an electronic apparatus including the above-described electro-optic apparatus (however, including the other various types of aspects) according to the application example of the invention.

According to this configuration, since the above-described electro-optic apparatus according to the application example of the invention is included, it is possible to implement various types of electronic apparatuses, such as a projection-type display apparatus, a television, a mobile phone, an electronic organizer, a word processor, a view finder type or monitor direct viewing-type video tape recorder, a workstation, a video phone, a Point-Of-Sale (POS) terminal, and a touch panel, which can perform high-quality display. In addition, it is possible to implement an electrophoretic apparatus, for example, electronic paper, as the electronic apparatus according to the application example of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments in which the invention is implemented will be described below with reference to the accompanying drawings. Meanwhile, the drawings to be illustrated are appropriately enlarged or reduced so that sections to be illustrated can be recognized.

Meanwhile, in the embodiments below, for example, a case of the description, "on a substrate" includes a case in which something is arranged to abut against a substrate, a case in which something is arranged on a substrate while interposing another component therebetween, and a case in which something is arranged such that a part thereof abuts against the substrate and another part thereof is arranged on the substrate while interposing another component therebetween.

First Embodiment

Configuration of Electro-Optic Apparatus

Figure 1:
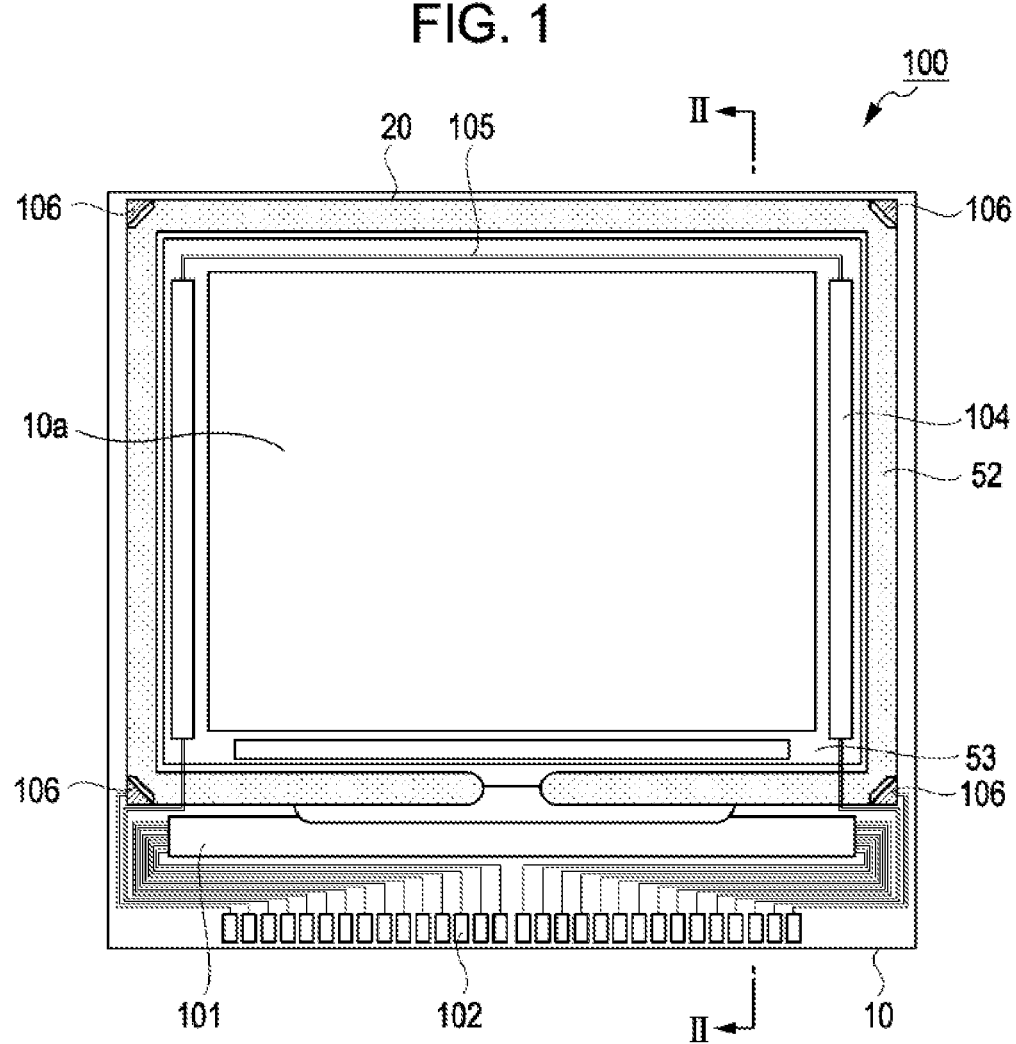
FIG. 1 is a schematic plan view illustrating the whole configuration of an electro-optic apparatus according to a first embodiment.

FIG. 1 is a schematic plan view illustrating the configuration of a liquid crystal apparatus as an electro-optic apparatus.

Figure 2:
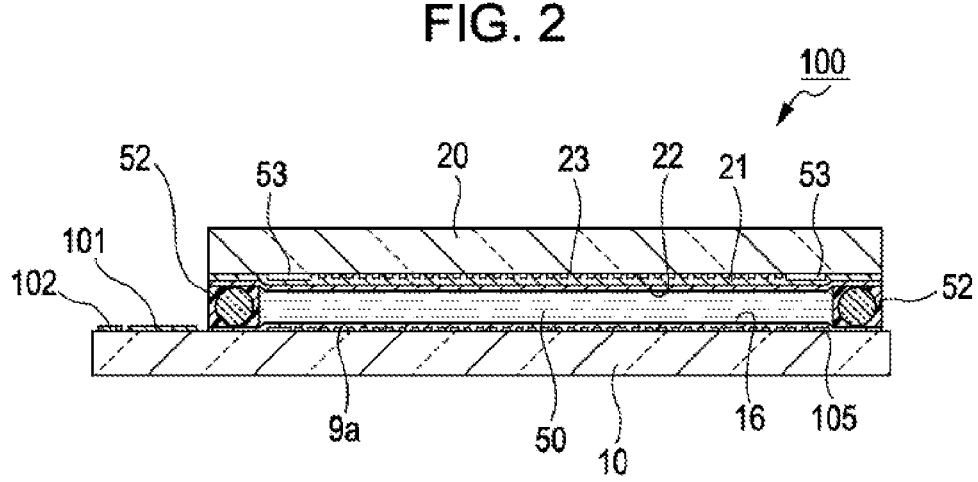
FIG. 2 is a schematic cross-sectional view taken along the line II-II in FIG. 1.

FIG. 2 is a schematic cross-sectional view taken along the line II-II of the liquid crystal apparatus shown in FIG. 1. Hereinafter, the configuration of the liquid crystal apparatus will be described with reference to FIGS. 1 and 2. Further, in the embodiments below, an example of the electro-optic apparatus according to an aspect of the invention will be described using a liquid crystal apparatus using a method of driving a TFT active matrix equipped with a driving circuit.

As shown in FIGS. 1 and 2, in a liquid crystal apparatus 100 according to the embodiment, a TFT array substrate 10 as a substrate and a counter substrate 20 are arranged to face each other. The TFT array substrate 10 includes a transparent substrate, for example, a quartz substrate or a glass substrate, and a silicon substrate. The counter substrate 20 includes a transparent substrate, for example, a quartz substrate or a glass substrate.

A liquid crystal layer 50 is interposed between the TFT array substrate 10 and the counter substrate 20. The liquid crystal layer 50 is formed of a liquid in which, for example, one type of or various types of Nematic liquid crystal are mixed, and is in a predetermined orientation state between a pair of oriented films.

The TFT array substrate 10 and the counter substrate 20 are bonded to each other using a sealant 52 which is provided in a seal region located around an image display region 10a in which a plurality of pixel electrodes 9a are provided.

The sealant 52 is formed of, for example, ultraviolet curing resin or thermoset resin in order to bond both substrates. After the sealant 52 is coated on the TFT array substrate 10 in a manufacturing process, the sealant 52 is treated with ultraviolet irradiation and heated, so that the sealant 52 is hardened.

In the sealant 52, a gap member, such as glass fiber or glass beads, is dispersed in order to set the gap between the TFT array substrate 10 and the counter substrate 20 (that is, the gap between the substrates) to a predetermined value. Further, the gap member may be arranged in the image display region 10a or a region peripheral to the image display region 10a in such a way as to add the gap member to a material which is mixed with the sealant 52 or instead of the sealant 52.

A frame-shaped shield film 53 having opacity which defines the frame-shaped region of the image display region 10a is provided on the side of the counter substrate 20 in parallel to the inner side of the seal region in which the sealant 52 is arranged. Further, a part of or the entirety of the frame-shaped shield film 53 may be provided on the side of the TFT array substrate 10 as a built-in shield film.

In the region, located on the external side of the seal region in which the sealant 52 is arranged, of the peripheral region, a data line driving circuit 101 and external circuit connection terminals 102 are provided Along one side of the TFT array substrate 10. Scan line driving circuits 104 are provided along two sides which are adjacent to the one side, that is, the scan line driving circuits 104 are provided to be covered by the frame-shaped shield film 53.

Further, in order to connect the area between two scan line driving circuits 104 which are provided on both sides of the image display region 10a as described above, a plurality of wirings 105 are provided Along a remaining side of the TFT array substrate 10, that is, the plurality of wirings 105 are provided to be covered by the frame-shaped shield film 53.

In regions which face four corners of the counter substrate 20 on the TFT array substrate 10, top and bottom conduction terminals 106 are arranged in order to connect both substrates using a top and bottom conduction material. Therefore, electricity can be conducted between the TFT array substrate 10 and the counter substrate 20.

In FIG. 2, on the TFT array substrate 10, a laminated structure, manufactured with TFTs which are driving devices for switching pixels and wirings such as scan lines and data lines, is formed. Although the detailed configuration of the laminated structure is not shown in FIG. 2, pixel electrodes 9a, which are formed of a transparent material such as Indium Tin Oxide (ITO), are formed in the shapes of islands in a predetermined pattern for each pixel on the laminated structure.

The pixel electrodes 9a are formed on the image display region 10a of the TFT array substrate 10 such that the pixel electrodes 9a face counter electrodes 21. On the surface of the side of the TFT array substrate 10 which abuts against the liquid crystal layer 50, that is, on the pixel electrodes 9a, an oriented film 16 is formed to cover the pixel electrodes 9a.

On the counter surface of the counter substrate 20 which faces the TFT array substrate 10, a shield film 23 is formed. The shield film 23 is formed in a lattice shape on, for example, the counter surface of the counter substrate 20 when viewed from the plane.

In the counter substrate 20, a non-opening region is defined using the shield film 23, and a region separated using the shield film 23 is an opening region through which light emitted from, for example, a lamp for a projector or a viewing backlight passes. Further, the shield film 23 is formed in a stripe shape, and the non-opening region may be defined using the shield film 23 and various types of components, such as data lines, provided on the side of the TFT array substrate 10.

On the shield film 23, the counter electrodes 21, formed of a transparent material, such as ITO, are formed to face the plurality of pixel electrodes 9a. In addition, on the shield film 23, color filters which are not shown in FIG. 2 may be formed on a region which includes a part of the opening region and the non-opening region in order to perform color display in the image display region 10a. On the counter surface of the counter substrate 20, an oriented film 22 is formed on the counter electrodes 21.

Further, on the TFT array substrate 10 shown in FIGS. 1 and 2, in addition to the above-described driving circuits, such as the data line driving circuit 101 and the scan line driving circuits 104, a sampling circuit which samples an image signal on image signal lines and supplies the result of the sampling to data lines, a pre-charge circuit which supplies a pre-charge signal at a predetermined voltage level to the plurality of data lines previous to the image signal, and an inspection circuit which inspects the quality or defects of the liquid crystal apparatus 100 when the liquid crystal apparatus 100 is manufactured or shipped may be formed.

Figure 3:
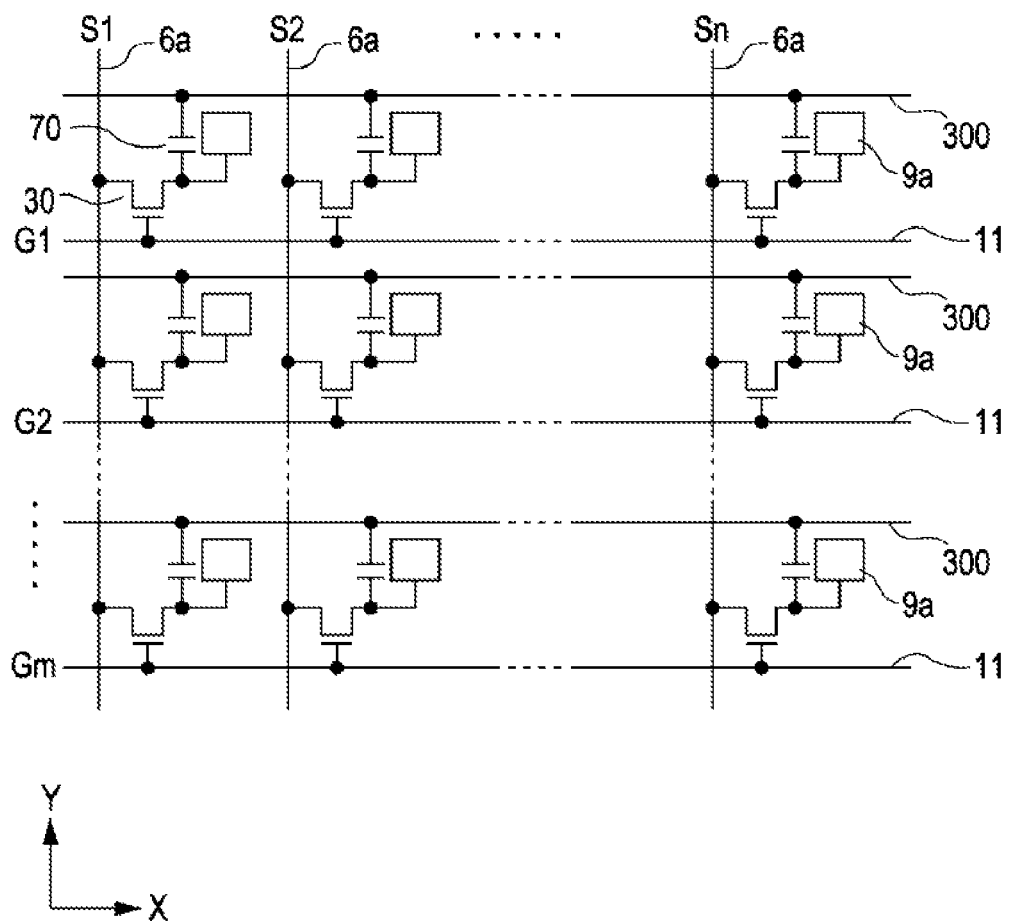
FIG. 3 is an equivalent circuit diagram illustrating various types of devices and wiring of an image display region of the electro-optic apparatus.

FIG. 3 is an equivalent circuit diagram illustrating the electrical configuration of the liquid crystal apparatus. Hereinafter, the electrical configuration of the liquid crystal apparatus will be described with reference to FIG. 3.

As shown in FIG. 3, a pixel electrode 9a and a TFT 30 are formed in each of a plurality of pixels included in the image display region 10a and formed in a matrix. The TFT 30 is electrically connected to the pixel electrode 9a, and controls the switching of the pixel electrode 9a when the liquid crystal apparatus 100 according to the embodiment operates.

A data line 6a to which an image signal is supplied is electrically connected to the source of the TFT 30. An image signal S1, S2, . . . , or Sn to be written to the data line 6a may be sequentially supplied in this line order, or may be supplied to a plurality of adjacent data lines 6a for each group.

A scan line 11 is electrically connected to the gate of the TFT 30, and the liquid crystal apparatus according to the embodiment is configured such that each of scanning signals G1, G2, ..., Gm is sequentially applied in this order to the scan line 11 at a predetermined timing in pulse manner.

The pixel electrode 9a is electrically connected to the drain of the TFT 30. The image signal S1, S2, ..., or Sn supplied from the data line 6a is written at a predetermined timing by closing the switch of the TFT 30 which is a switching device for a predetermined period. The image signal S1, S2, ..., or Sn at a predetermined level, which is written in a liquid crystal functioning as an example of an electro-optic medium, is held between the pixel electrode 9a and counter electrode 21 formed on the counter substrate 20 for a predetermined period.

Liquid crystal included in the liquid crystal layer 50 (refer to FIG. 2) enables light to be modulated and grayscale to be displayed in such a way that the orientation and order of molecular association are changed depending on the level of applied voltage. For example, in the case of normally white mode, transmittance corresponding to incident light decreases according to the voltage applied in units of each pixel. In the case of normally black mode, transmittance corresponding to incident light increases according to the voltage applied in units of each pixel. Therefore, light having contrast according to the image signal is emitted from the liquid crystal apparatus 100 as a whole.

Here, in order to prevent the image signal held here from being leaked, an accumulation capacity 70 is added to a liquid crystal capacity, formed between the pixel electrode 9a and the counter electrode 21 (refer to FIG. 2), in parallel. The accumulation capacity 70 is a capacity device which functions as a retention capacity which temporarily holds the potential of each pixel electrode 9a according to the supply of the image signal.

Figure 4:
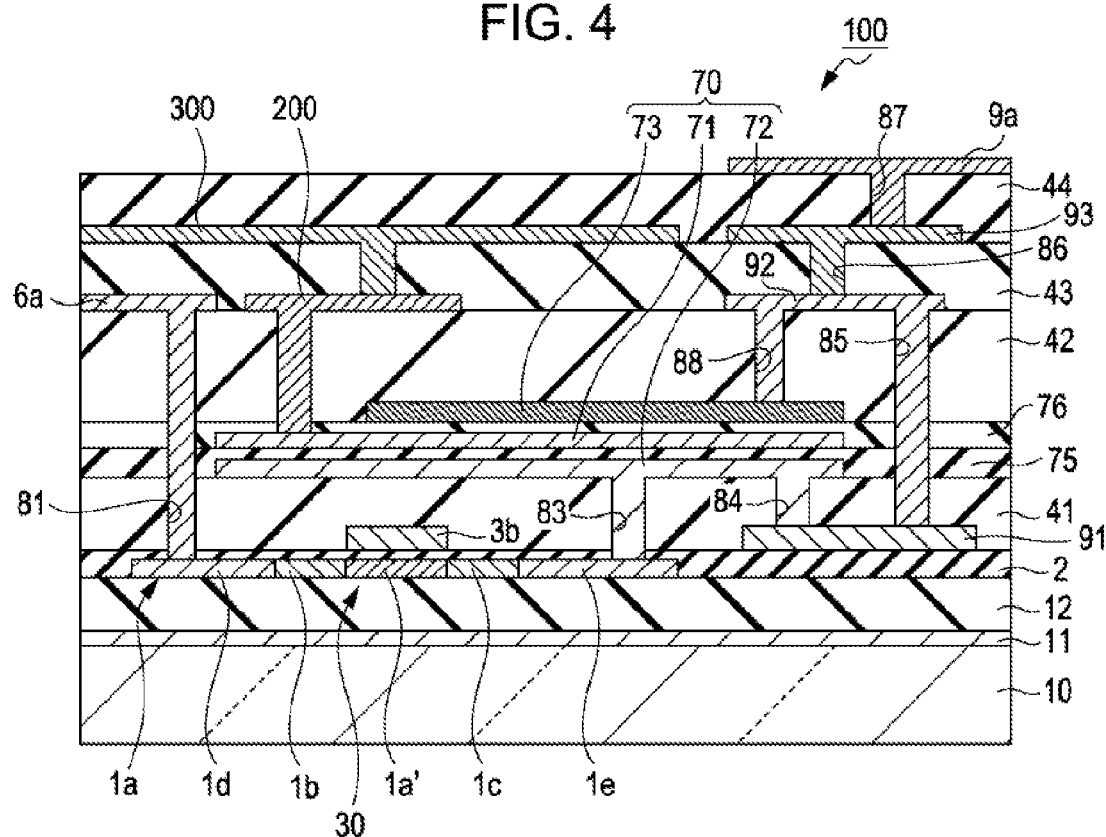
FIG. 4 is a schematic cross-sectional view illustrating a laminated structure of the electro-optic apparatus.
Figure 5:
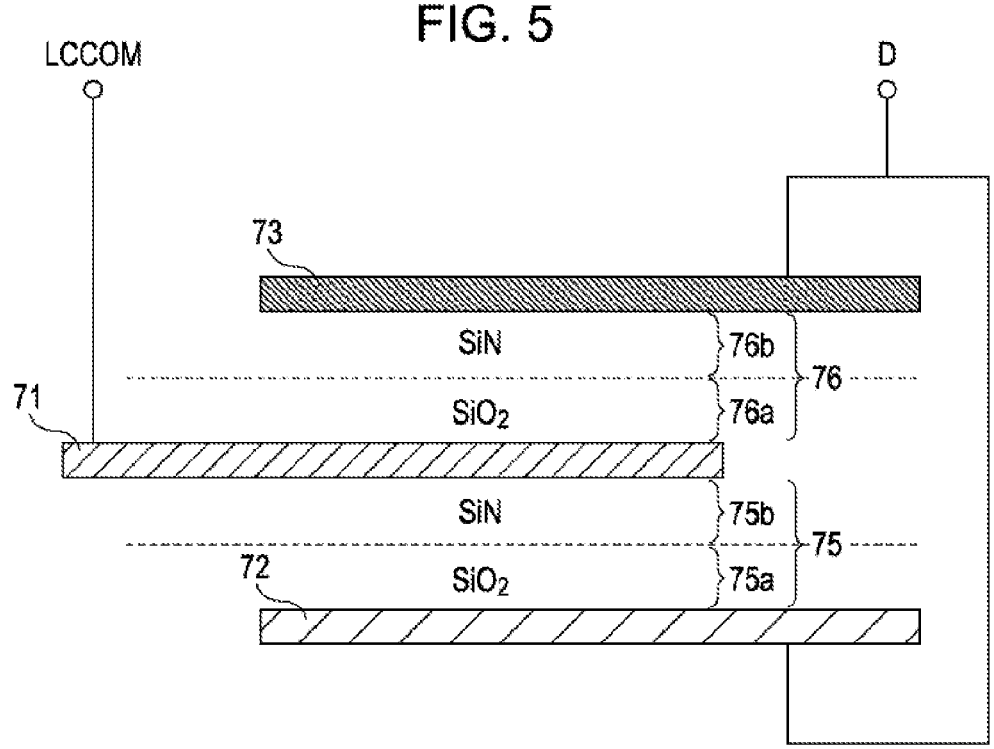
FIG. 5 is a schematic cross-sectional view illustrating the detailed configuration of a retention capacity of the electro-optic apparatus.

FIG. 4 is a schematic cross-sectional view illustrating the structure of the liquid crystal apparatus. FIG. 5 is a schematic cross-sectional view illustrating the detailed configuration of a retention capacity of the liquid crystal apparatus. Hereinafter, the configuration of the liquid crystal apparatus and the retention capacity will be described with reference to FIGS. 4 and 5.

As shown in FIG. 4, the TFT 30 has an LDD structure, and includes a semiconductor layer 1a and a gate electrode 3b. The semiconductor layer 1a is formed of, for example, polysilicon. In detail, the semiconductor layer 1a includes a channel region 1a', a data line side LDD region 1b, a pixel electrode side LDD region 1c, a data line side source-drain region 1d, and a pixel electrode side source-drain region 1e.

The data line side source-drain region 1d and the pixel electrode side source-drain region 1e are substantially mirror symmetrically formed with reference to the channel region 1a'. The data line side LDD region 1b is formed between the channel region 1a' and the data line side source-drain region 1d. The pixel electrode side LDD region 1c is formed between the channel region 1a' and the pixel electrode side source-drain region 1e.

The data line side LDD region 1b, the pixel electrode side LDD region 1c, the data line side source-drain region 1d, and the pixel electrode side source-drain region 1e are impurity regions obtained by inputting impurity into the semiconductor layer 1a using, for example, an ion implantation method.

Each of the data line side LDD region 1b and the pixel electrode side LDD region 1c is formed as a low concentration impurity region which includes fewer impurities than each of the data line side source-drain region 1d and the pixel electrode side source-drain region 1e. Using such an impurity region, it is possible to reduce off-current which flows between the source region and the drain region when the TFT 30 is not operated, that is, it is possible to suppress the decrease in on-current which flows when the TFT 30 is operated.

Further, Although it is preferable that the TFT 30 has the LDD structure, the TFT 30 may have an offset structure in which impurities are not injected into the data line side LDD region 1b and the pixel electrode side LDD region 1c, and may have a self-alignment type structure in which the data line side source-drain region 1d and the pixel electrode side source-drain region 1e are formed by using the gate electrode 3b as a mask and injecting heavily-concentrated impurities.

The gate electrode 3b is formed of, for example, conductive polysilicon, and is formed to partially face the channel region 1a' of the semiconductor layer 1a. A gate insulation film 2 insulates the gate electrode 3b from the semiconductor layer 1a. Further, a first relay layer 91 is formed on the same layer as the gate electrode 3b.

A scan line 11 is provided on a layer side which is lower than the TFT 30 arranged on the TFT array substrate 10 with reference to an underlaying insulation film 12. The scan line 11 is formed of a shading typed material, such as a metallic element, an alloy, metal silicide, or polysilicide, which includes at least one high melting metal from among, for example, Ti (titanium), Cr (chromium), W (tungsten), Ta (tantalum), Mo (molybdenum), and Pd (palladium), or the scan line 11 is formed of a material in which the above-materials are laminated.

The scan line 11 functions as a lower side shield film which performs the backside reflection of the TFT array substrate 10 or which shields the channel region 1a' of the TFT 30 and the periphery thereof from light which is irradiated from another liquid crystal apparatus and comes through a synthetic optical system, that is, return light which is incident upon the apparatus from the side of the TFT array substrate 10 using a double board-type projector.

The underlaying insulation film 12 is formed on the entire surface of the TFT array substrate 10, and has a function of insulating the layers of the scan line 11 and TFT 30 and a function of preventing the property of the TFT 30 for switching a pixel from being deteriorated due to the roughness occurring when the surface of the TFT array substrate 10 is polished or due to the contamination remained after cleaning.

An accumulation capacity 70 is provided on the layer side which is upper than the TFT 30 arranged on the TFT array substrate 10 with reference to a first interlayer insulation film 41. The accumulation capacity 70 is an example of the "retention capacity" of the application example of the invention, and is formed in such a way that a first electrode 71 and a second electrode 72 are arranged to face each other while interposing a lower side capacity insulation film 75 which functions as a first capacity insulation film, and that the first electrode 71 and the third electrode 73 are arranged to face each other while interposing an upper side capacity insulation film 76 which functions as a second capacity insulation film.

The first electrode 71 is a fixed electrical potential side capacity electrode which is electrically connected to a constant potential source through a capacity line 300 and a capacity relay layer 200, and is held at fixed electrical potential. The first electrode 71 is formed of, for example, a metal such as Al (Aluminum) or Ag (silver), or a non-transparent metallic film including an alloy, and functions as an upper side shield film (built-in shield film) which shields the TFT 30.

Further, the first electrode 71 may be formed of a metallic element, an alloy, metal silicide, or polysilicide, which includes at least one high melting metal from among, for example, Ti, Cr, W, Ta, Mo, and Pd, or a material in which the above-materials are laminated. In this case, it is possible to upgrade the function as the built-in shield film of the first electrode 71.

The second electrode 72 is a pixel potential side capacity electrode which is electrically connected to the pixel electrode side source-drain region 1e of the TFT 30 and the pixel electrode 9a. In further detail, the second electrode 72 is electrically connected to the pixel electrode side source-drain region 1e through a contact hole 83, and is electrically connected to the first relay layer 91 through a contact hole 84. The first relay layer 91 is electrically connected to the second relay layer 92 through a contact hole 85.

The second relay layer 92 is electrically connected to a third relay layer 93 through a contact hole 86. The third relay layer 93 is electrically connected to the pixel electrode 9a through a contact hole 87. That is, the second electrode 72 relays the electrical connection between the pixel electrode side source-drain region 1e and the pixel electrode 9a, together with the first relay layer 91, the second relay layer 92, and the third relay layer 93.

The third electrode 73 is electrically connected to the second relay layer 92 through a contact hole 88. Therefore, the third electrode 73 is at the same potential (in other words, the same potential as that of the pixel electrode 9a) as the second electrode 72.

Each of the lower side capacity insulation film 75 and the upper side capacity insulation film 76 has a multi-layer structure including, for example, an oxide silicon ($SiO_2$) film, such as a High Temperature Oxide (HTO) film or a Low Temperature Oxide (LTO) film, or an oxide silicon (SiN) film. Hereinafter, the detailed configuration of the accumulation capacity 70 will be described.

In FIG. 5, the lower side capacity insulation film 75 includes, in order from the side of the second electrode 72, a first layer 75a which is formed of $SiO_2$ and functions as the first insulation film, and a second layer 75b (a plurality of insulation films) which is formed of SiN and functions as the second insulation film. Meanwhile, the upper side capacity insulation film 76 includes, in order from the side of the first electrode 71, a third layer 76a which is formed of $SiO_2$ and functions as the first insulation film, and a fourth layer 76b (a plurality of insulation films) which is formed of SiN and functions as the second insulation film. The second electrode 72 and the third electrode 73 are formed while including the same material with each other.

According to the above-described configuration, in the capacity formed between the first electrode 71 and the second electrode 72 and the capacity formed between the first electrode 71 and the third electrode 73, different materials are laminated in the same order (the order of lamination is the same) when viewed from the side of the TFT array substrate 10. In detail, when viewed from the second electrode 72 which is arranged on the lower layer, the first layer 75a which is formed of $SiO_2$, the second layer 75b which is formed of SiN, and the first electrode 71 are sequentially arranged. At the same time, when viewed from the first electrode 71, the third layer 76a which is formed of $SiO_2$, the fourth layer 76b which is formed of SiN, and the third electrode 73 are sequentially arranged.

With the above-described configuration, it becomes clear that it is possible to reduce the temporal variation in fixed electrical potential (that is, LCCOM) to be supplied. The temporal variation in the fixed electrical potential causes flickering or image sticking. Therefore, if the accumulation capacity 70 according to the embodiment is used, it is possible to prevent the above-described defects on the display from being generated.

In addition, since the lower side capacity insulation film 75 is formed in this order, it is necessary to remove the part of the lower side capacity insulation film 75 (75a, 75b) which overlaps with the image display region 10a in a planar fashion when the first electrode 71 is formed. However, since the second layer 75b which is formed of SiN is arranged on the upper layer of the lower side capacity insulation film 75, it is possible to restrain the material of SiN from remaining on the image display region 10a. Therefore, it is possible to restrain transmittance from deteriorating.

Thereafter, it is necessary to remove the part of the upper side capacity insulation film 76 (76a, 76b) which overlaps with the image display region 10a in a planar fashion when the third electrode 73 is formed. However, since the fourth layer 76b which is formed of SiN is arranged on the upper layer of the upper side capacity insulation film 76, it is possible to restrain the fourth layer 76b which is formed of a material SiN from remaining on the image display region 10a. Therefore, it is possible to restrain transmittance from deteriorating.

Returning to FIG. 4, the data line 6a, the capacity relay layer 200, and the second relay layer 92 are provided on the layer side which is upper than the third electrode 73 which is arranged on the TFT array substrate 10 with reference to the second interlayer insulation film 42.

The data line 6a is electrically connected to the data line side source-drain region 1d of the semiconductor layer 1a through a contact hole 81 which passes through the first interlayer insulation film 41 and the second interlayer insulation film 42. The inside of the data line 6a and the contact hole 81 is formed of a material Al (Aluminum) which includes, for example, Al—Si—Cu and Al—Cu, an Al element, or a multi-layer film which is formed with an Al layer and a TiN layer. The data line 6a also has a function of shielding the TFT 30.

The capacity relay layer 200 and the second relay layer 92 are formed on the same layer as the data line 6a on the second interlayer insulation film 42. The data line 6a, the capacity relay layer 200, and the second relay layer 92 are formed in such a way that a thin film formed of a conductive material, for example, a metallic film, is formed on the second interlayer insulation film 42 using a thin film forming method, and are formed in the state in which the data line 6a, the capacity relay layer 200, and the second relay layer 92 are separated from each other by partially removing the thin film, that is, performing patterning. As described above, if the data line 6a, the capacity relay layer 200, and the second relay layer 92 are formed using the same processing, it is possible to simplify an apparatus manufacturing process.

The capacity line 300 and the third relay layer 93 are provided on the layer side which is upper than the data line 6a arranged on the TFT array substrate 10 with reference to the third interlayer insulation film 43.

The capacity line 300 is formed while including a metal, for example, Aluminum, and supplies fixed electrical potential to the first electrode 71 as described above. Meanwhile, the third relay layer 93 which is formed on the same layer as the capacity line 300 relays electrical conduction to the pixel electrode side source-drain region 1e of the semiconductor layer 1a and the pixel electrode 9a.

The pixel electrode 9a is formed on the layer side which is upper than the capacity line 300 with reference to the fourth interlayer insulation film 44. The pixel electrode 9a is electrically connected to the pixel electrode side source-drain region 1e of the semiconductor layer 1a through the third relay layer 93, the second relay layer 92, the first relay layer 91, and the second electrode 72. The contact hole 87 which electrically connects the pixel electrode 9a and the third relay layer 93 is formed in such a way that a conductive material, such as ITO, which forms the pixel electrode 9a forms a film in the inner wall of an opening which is formed to pass through the fourth interlayer insulation film 44. On the upper side surface of the pixel electrode 9a, an oriented film on which a predetermined orientation processing, such as a rubbing processing, is performed is provided.

The above-described configuration of the pixel unit is the same as each pixel unit, and relevant pixel units are formed in the image display region 10a (refer to FIG. 1) at intervals.

As described above, according to the liquid crystal apparatus 100 according to the embodiment, effects shown below can be obtained.

(1) According to the liquid crystal apparatus 100 according to the embodiment, the accumulation capacity 70 which is provided between the TFT 30 and the pixel electrode 9a is formed by laminating, in order from the side of the second electrode 72, the first layer 75a formed of $SiO_2$, the second layer 75b formed of SiN, and further, and the first electrode 71, and further, in order from the side of the first electrode 71, the third layer 76a formed of $SiO_2$, the fourth layer 76b formed of SiN, and the third electrode 73, so that it becomes clear that it is possible to reduce the temporal variation in fixed electrical potential (that is, LCCOM) to be supplied. The temporal variation in the fixed electrical potential causes flickering or image sticking. Therefore, if the accumulation capacity 70 according to the embodiment is used, it is possible to prevent the above-described defects on the display from being generated, thereby enabling a high-quality image to be displayed as a result.

Second Embodiment

Configuration of Electro-Optic Apparatus

Figure 6:
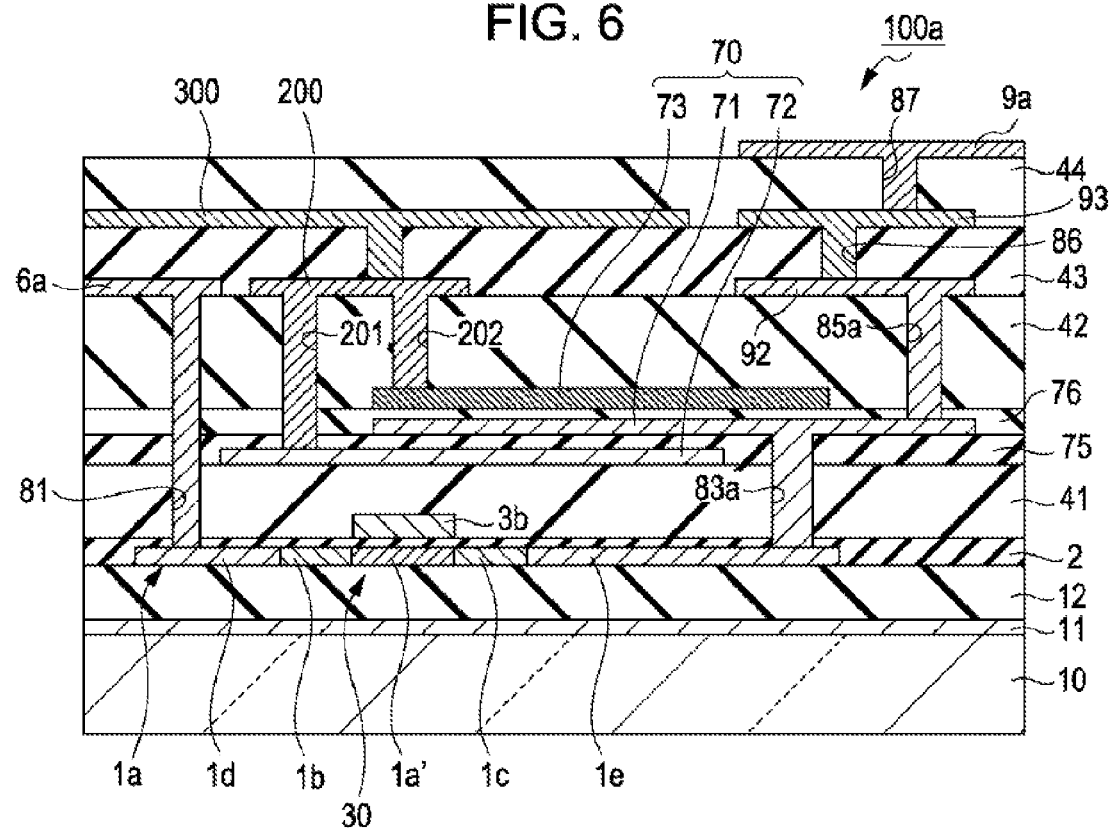
FIG. 6 is a schematic cross-sectional view illustrating a laminated structure of an electro-optic apparatus according to a second embodiment.
Figure 7:
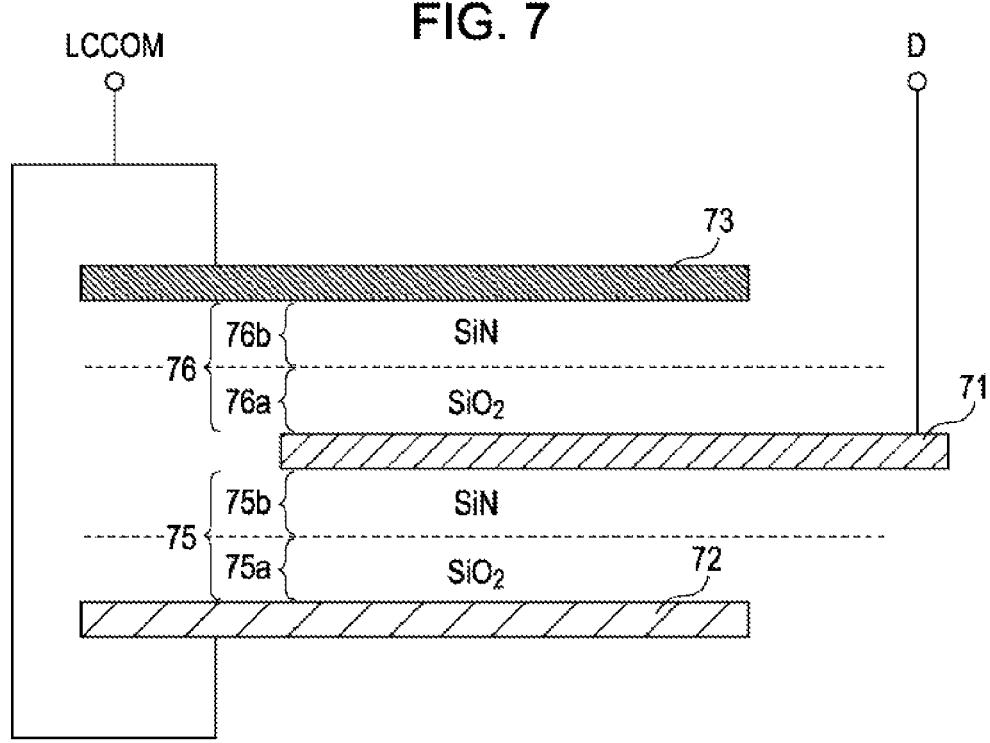
FIG. 7 is a schematic cross-sectional view illustrating the detailed configuration of the retention capacity of the electro-optic apparatus.

FIG. 6 is a schematic cross-sectional view illustrating the structure of a liquid crystal apparatus as an electro-optic apparatus according to a second embodiment. FIG. 7 is a schematic cross-sectional view illustrating the detailed configuration of a retention capacity of the liquid crystal apparatus. Hereinafter, the configuration of the liquid crystal apparatus will be described with reference to FIGS. 6 and 7.

Compared to the above-described first embodiment, the liquid crystal apparatus 100a according to the second embodiment has a laminated structure which is partially different from that of the first embodiment, and the other configuration is almost similar thereto. Therefore, in the second embodiment, parts which are different from the first embodiment will be described in detail, and the description of other duplicated parts will be appropriately omitted.

As shown in FIG. 6, in the liquid crystal apparatus 100a according to the second embodiment, a first electrode 71 is electrically connected between a TFT 30 and a pixel electrode 9a. In detail, the first electrode 71 is electrically connected to the pixel electrode side source-drain region 1e of a semiconductor layer 1a through a contact hole 83a, and electrically connected to a second relay layer 92 through a contact hole 85a.

Meanwhile, a second electrode 72 and a third electrode 73 are electrically connected to a capacity line 300. In detail, the second electrode 72 and the third electrode 73 are electrically connected to a capacity relay layer 200 through respective contact hole 201 and contact hole 202.

As described above, in the liquid crystal apparatus 100a according to the second embodiment, the electrical relationship between electrodes included in an accumulation capacity 70 is contrary to that of the liquid crystal apparatus 100 according to the first embodiment. Even in this case, two capacities which are connected in parallel can be implemented on each of the upper layer side and the lower layer side of the first electrode 71.

As shown in FIG. 7, when viewed from the side of the second electrode 72, a first layer 75a formed of $SiO_2$ and a second layer 75b formed of SiN are sequentially arranged in the lower side capacity insulation film 75. In addition, the first electrode 71 is arranged. Meanwhile, when viewed from the side of the first electrode 71, a third layer 76a formed of $SiO_2$ and a fourth layer 76b formed of SiN are formed in the upper side capacity insulation film 76. In addition, the third electrode 73 is arranged. The second electrode 72 and the third electrode 73 are formed while including the same material with each other.

With the above-described configuration, it becomes clear that it is possible to reduce the temporal variation in fixed electrical potential (that is, LCCOM) to be supplied. The temporal variation in the fixed electrical potential causes flickering or image sticking. Therefore, if the accumulation capacity 70 according to the embodiment is used, it is possible to prevent the above-described defects on the display from being generated.

In addition, like the first embodiment, the part of the lower side capacity insulation film 75 (75a, 75b) which overlaps with the image display region 10a in a planar fashion is removed when the first electrode 71 is formed. However, since the second layer 75b which is formed of SiN is arranged on the upper layer of the lower side capacity insulation film 75, it is possible to restrain the material of SiN from remaining on the image display region 10a. Therefore, it is possible to restrain transmittance from deteriorating. Meanwhile, the same process is performed on the upper side capacity insulation film 76.

In addition, the second electrode 72 and the third electrode 73 are connected to the fixed electrical potential (that is, LCCOM). Therefore, even when, for example, the potential of the data line which is arranged on the upper side of the third electrode 73 varies, the potential of the third electrode 73 is stable, so that it is possible to restrain the potential of the capacity from being varied. Therefore, it is possible to restrain crosstalk attributable to the variation in the potential of the capacity from being generated, and it is possible to improve the quality of display. In other words, an advantage of the application examples of the invention is strong for noise.

As described above, according to the liquid crystal apparatus 100a according to the second embodiment, effects shown below can be obtained.

(2) According to the liquid crystal apparatus 100a according to the second embodiment, the accumulation capacity 70 which is provided between the TFT 30 and the pixel electrode 9a is formed by laminating, in order from the side of the second electrode 72, the first layer 75a formed of $SiO_2$, the second layer 75b formed of SiN, and further, and the first electrode 71, and further, in order from the side of the first electrode 71, the third layer 76a formed of $SiO_2$, the fourth layer 76b formed of SiN, and the third electrode 73, so that it becomes clear that it is possible to reduce the temporal variation in fixed electrical potential (that is, LCCOM) to be supplied. The temporal variation in the fixed electrical potential causes flickering or image sticking. Therefore, if the accumulation capacity 70 according to the embodiment is used, it is possible to prevent the above-described defects on the display from being generated, thereby enabling a high-quality image to be displayed as a result.

Third Embodiment

Configuration of Electronic Apparatus

Figure 8:
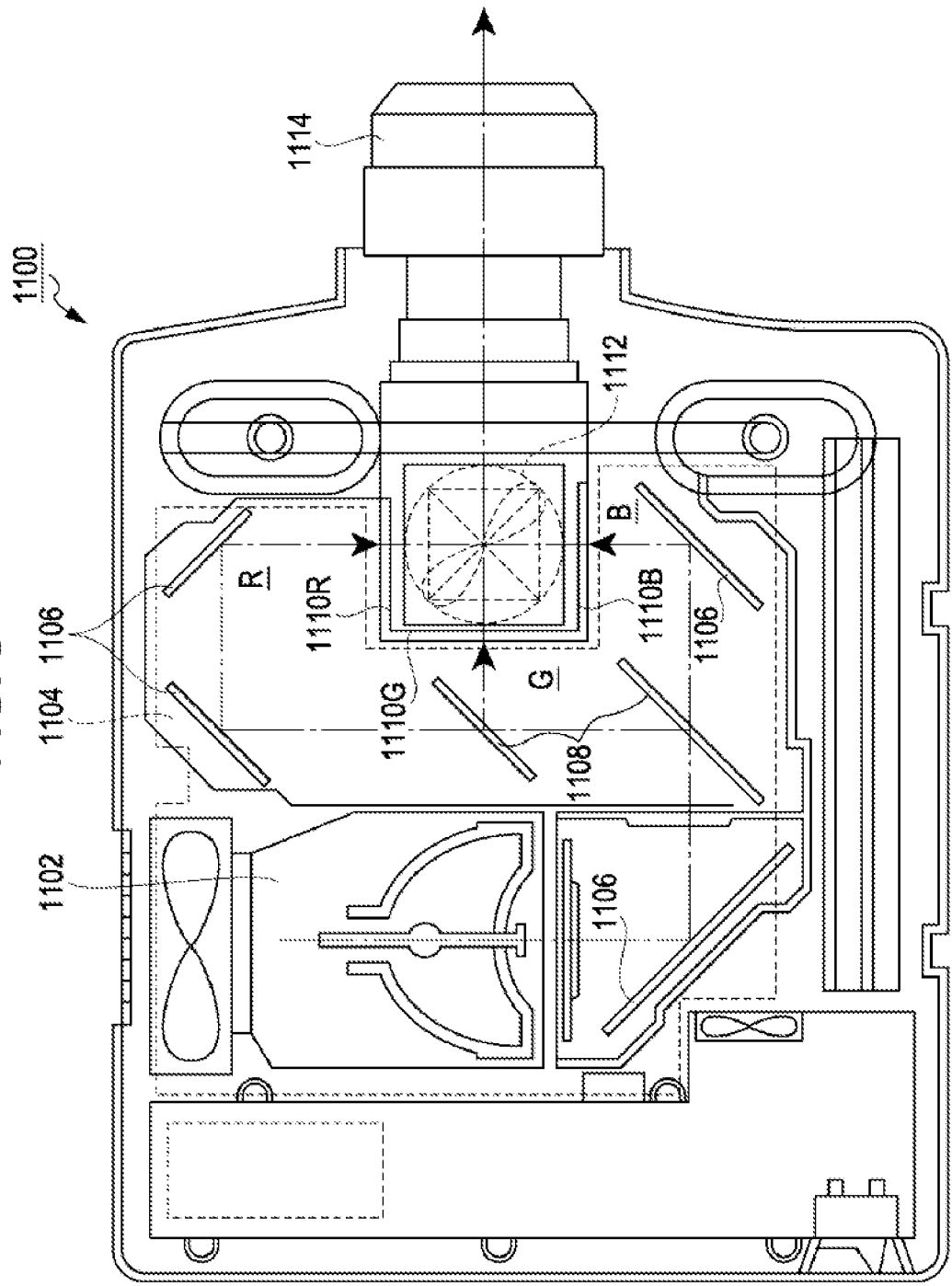
FIG. 8 is a schematic view illustrating the configuration of an electronic apparatus (projector) including the electro-optic apparatus.

FIG. 8 is a schematic view illustrating the configuration of a projector as an electronic apparatus including the above-described liquid crystal apparatus. Hereinafter, the configuration of the projector which uses the liquid crystal apparatus as a light valve will be described with reference to FIG. 8.

As shown in FIG. 8, a lamp unit 1102 which includes a white light source such as a halogen lamp is provided in the inside of a projector 1100. Incident light irradiated from the lamp unit 1102 is divided into three primary colors RGB by four mirrors 1106 and two dichroic mirrors 1108 which are arranged in a light guide 1104, and is incident upon liquid crystal panels 1110R, 1110B and 1110G which function as light valves corresponding to the respective primary colors.

The configurations of the liquid crystal panels 1110R, 1110B, and 1110G are equivalent to the above-described liquid crystal apparatuses 100 and 100a, and each of the liquid crystal panels 1110R, 1110B, and 1110G are driven using primary color signals R, G, and B which are supplied from an image signal processing circuit. Further, light modulated by these liquid crystal panels 1110R, 1110B, and 1110G is incident upon a dichroic prism 1112 from three directions. At the dichroic prism 1112, each R and B light is refracted to 90 degrees, and G light goes straight. Therefore, a colored image is projected on a screen through a projection lens 1114 as the result of the combination of the images of respective colors.

Here, with regard to a display image obtained using each of the liquid crystal panels 1110R, 1110B, and 1110G, it is necessary to horizontally reverse a display image obtained using the liquid crystal panel 1110G with respect to display images obtained using the liquid crystal panels 1110R and 1110B.

Further, since light which corresponds to each of the primary colors R, G, and B is incident upon each of the liquid crystal panels 1110R, 1110B, and 1110G using the dichroic mirror 1108, it is not necessary to provide color filters.

Further, in addition to the electronic apparatus which has been described with reference to FIG. 8, a mobile-type personal computer, a mobile phone, a liquid crystal television, a view finder type or monitor direct viewing-type video tape recorder, a car navigation apparatus, a pager, an electronic organizer, a desk-top calculator, a word processor, a workstation, a video phone, a Point-Of-Sale (POS) terminal, and an apparatus including a touch panel are used. In addition, an apparatus which can be applied to these various types of electronic apparatuses can be obviously used.

In addition, in addition to the liquid crystal apparatuses described in the above-described respective embodiments, the application example of the invention can be applied to a Liquid Crystal On Silicon (LCOS), a Plasma Display Panel (PDP), a Field Emission Display (FED, SED), an organic electroluminescence (EL) display, a Digital Micromirror Device (DMD), and an electrophoretic apparatus.

As described above, according to the electronic apparatus according to the third embodiment, an effect below can be obtained.

(3) According to the electronic apparatus according to the third embodiment, since the application example of the invention includes the above-described liquid crystal apparatuses 100 and 100a, it is possible to implement an electronic apparatus which can perform high-quality display.

The application example of the invention is not limited to the above-described embodiments, and can be appropriately modified without departing from the scope of the aspect, and the gist or spirit of the application example of the invention read from the whole specification. An electro-optic apparatus and an electronic apparatus including the electro-optic apparatus, on which such modification is performed, are included in the technical scope of the application example of the invention.

This application claims priority from Japanese Patent Application No. 2011-178251 filed in the Japanese Patent Office on Aug. 17, 2011, the entire disclosure of which is hereby incorporated by reference in its entirely.

What is claimed is:

1. An electro-optic apparatus, comprising:
   a pixel electrode which is provided for each pixel;
   a transistor which is provided to correspond to each pixel electrode; and
   a capacitor which is provided between the pixel electrode and the transistor, the capacitor including
      a first electrode, a second electrode arranged to face a transistor side of the first electrode, a first insulation film provided between the first electrode and the second electrode, a second insulation film provided between the first electrode and the first insulation film, a third electrode arranged to face a pixel electrode side of the first electrode, a third insulation film provided between the first electrode and the third electrode, and a fourth insulation film provided between the third electrode and the third insulation film,
   wherein,
      the first insulation film and the third insulation film include a silicon oxide,
      the second insulation film and the fourth insulation film include a silicon nitride,
      the second electrode and the third electrode are electrically connected via a relay wiring, and
      a lamination order of the first insulation film including the silicon oxide and the second insulation film including the silicon nitride arranged on the transistor side of the first electrode, and a lamination order of the third insulation film including the silicon oxide and the fourth insulation film including the silicon nitride arranged on the pixel electrode side of the first electrode, are asymmetrical about the first electrode.

2. The electro-optic apparatus according to claim 1,
   wherein a predetermined constant potential is supplied to the first electrode, and
   wherein the second electrode and the third electrode are electrically connected to the pixel electrode and the transistor, respectively.

3. The electro-optic apparatus according to claim 1,
   wherein the first electrode is electrically connected to the pixel electrode and the transistor, and
   wherein a predetermined constant potential is supplied to each of the second electrode and the third electrode.

4. An electronic apparatus comprising the electro-optic apparatus according to claim 1.

5. The electro-optic apparatus according to claim 1, wherein
   the first insulation film abuts the second electrode;
   the second insulation film abuts the first electrode;
   the third insulation film abuts the first electrode; and
   the fourth insulation film abuts the third electrode.

6. The electro-optic apparatus according to claim 5, wherein
   the second insulation film abuts the first electrode on a side of the first electrode facing the transistor; and the third insulation film abuts the first electrode on a side of the first electrode facing the pixel electrode.

7. An electro-optic apparatus, comprising:
a pixel electrode;
a transistor that is electrically connected to the pixel electrode; and
a capacitor that is electrically connected to the pixel electrode, the capacitor including a first electrode, a second electrode, a third electrode, a first insulation film that is disposed between the first electrode and the second electrode, a second insulation film that is disposed between the first electrode and the first insulation film, a third insulation film that is disposed between the first electrode and the third electrode, and a fourth insulation film that is disposed between the third electrode and the third insulation film,
wherein,
the first insulation film and the third insulation film include a silicon oxide,
the second insulation film and the fourth insulation film include a silicon nitride
the second electrode and the third electrode are electrically connected via a relay wiring, and
a lamination order of the first insulation film including the silicon oxide and the second insulation film including the silicon nitride arranged on the transistor side of the first electrode, and a lamination order of the third insulation film including the silicon oxide and the fourth insulation film including the silicon nitride arranged on the pixel electrode side of the first electrode, are asymmetrical about the first electrode.

8. The electro-optic apparatus according to claim 7,
wherein the first electrode is electrically connected to the pixel electrode.

9. The electro-optic apparatus according to claim 7,
wherein the relay wiring is electrically connected to a capacitor wiring.

10. The electro-optic apparatus according to claim 1,
wherein the relay wiring extends through a contact hole in one or more layers on which the first electrode and at least one of the second electrode and the third electrode are formed.

11. The electro-optic apparatus according to claim 1,
wherein the second electrode is electrically connected to the transistor, the third electrode is electrically connected to the pixel electrode, and a predetermined constant potential is supplied to the first electrode.

12. The electro-optic apparatus according to claim 7,
wherein the relay wiring extends through a contact hole in one or more layers on which the first electrode and at least one of the second electrode and the third electrode are formed.

13. The electro-optic apparatus according to claim 7,
wherein the second electrode is electrically connected to the transistor, the third electrode is electrically connected to the pixel electrode, and a predetermined constant potential is supplied to the first electrode.

* * * * *